United States Patent [19]

Cahn

[11] 4,029,752

[45] June 14, 1977

[54] METHOD OF PRODUCING SULFUR FROM SULFUR DIOXIDE

[75] Inventor: Robert P. Cahn, Millburn, N.J.

[73] Assignee: Exxon Research and Engineering Company, Linden, N.J.

[22] Filed: Apr. 22, 1974

[21] Appl. No.: 462,747

Related U.S. Application Data

[63] Continuation-in-part of Ser. No. 364,888, May 29, 1973, abandoned.

[52] U.S. Cl. .................... 423/563; 423/237; 423/242; 423/244; 423/564; 423/567 R; 423/570; 423/541 A
[51] Int. Cl.² .......................................... C01B 17/16
[58] Field of Search ...... 423/567, 563, 569, 567 A, 423/541 A, 570, 237, 242, 244

[56] References Cited

UNITED STATES PATENTS

| 1,880,741 | 10/1932 | Boswell | 423/242 |
|---|---|---|---|
| 2,992,884 | 7/1961 | Bienstock et al. | 423/242 |
| 3,495,941 | 2/1970 | Van Helden | 423/563 |
| 3,645,671 | 2/1972 | Griffin et al. | 423/242 |
| 3,661,507 | 5/1972 | Breitbach et al. | 423/237 |
| 3,761,575 | 9/1973 | Furkert | 423/541 A |
| 3,773,900 | 11/1973 | Roberts et al. | 423/567 |
| 3,773,912 | 11/1973 | Spangler | 423/574 |
| 3,794,710 | 2/1974 | Merrill | 423/242 |
| 3,846,981 | 12/1974 | Paczkowski | 423/351 |

FOREIGN PATENTS OR APPLICATIONS

| 248,552 | 6/1960 | Australia | 423/570 |
|---|---|---|---|
| 587,892 | 1/1959 | Canada | 423/237 |

OTHER PUBLICATIONS

Chem. & Engr. News — 9/4/72 — pp. 54, 56.
Mellor — Comprehensive Treatise on Inorganic and Theoretical Chemistry, 1930 — vol. x — pp. 218, 219.
Jacobson — Encyclopedia of Chemical Runs — 1958 — vol. VII — p. 56.

*Primary Examiner*—G. O. Peters
*Assistant Examiner*—Eugene T. Wheelock
*Attorney, Agent, or Firm*—Wayne Hoover

[57] ABSTRACT

A method for reducing sulfur dioxide wherein ammonia is used as the reducing agent. The reduction may be accomplished either thermally or catalytically and the principal products obtained will be elemental sulfur and/or hydrogen sulfide, depending principally upon the particular conditions and relative reactant concentrations actually employed. The sulfur dioxide may be derived from essentially any source. In a preferred embodiment, however, the sulfur dioxide will be derived from a flue gas stream and the same will be separated therefrom with an absorption process wherein ammonia (on an aqueous ammoniacal solution) is also used as the absorbent.

22 Claims, 3 Drawing Figures

METHOD OF PRODUCING SULFUR FROM SULFUR DIOXIDE

RELATED APPLICATIONS

This application is a continuation-in-part of copending application Ser. No. 364,888, filed May 29, 1973, now abandoned.

BACKGROUND OF THE INVENTION

This invention relates to a process for the reduction of sulfur dioxide and to a method of separating sulfur dioxide from a gaseous mixture containing the same wherein the sulfur dioxide is subsequently reduced with the reducing agent of this invention. More particularly, this invention relates to a process for the reduction of sulfur dioxide with ammonia and to a method of separating sulfur dioxide from a gaseous mixture containing the same wherein the separated sulfur dioxide is subsequently reduced with ammonia.

The reduction of sulfur dioxide generally, and the reduction of sulfur dioxide, specifically, in a regeneration off gas stream from a flue gas desulfurization process are, of course, known. For example, F. M. Dautzenberg et al, *Chemical Engineering Progress*, 67, No. 8, pp. 86–91 (August 1971) describes a process for desulfurizing flue gas using a solid copper oxide on alumina sorbent, regenerating the sorbent with a reducing gas such as hydrogen, and reducing the sulfur dioxide in the regeneration off gas to elemental sulfur. The off gas may be concentrated to 100% $SO_2$ prior to reduction if desired. The stream of sulfur dioxide or regeneration off gas is split into two portions containing ⅔ and ⅓, respectively, of the total; the larger portion is reduced catalytically to hydrogen sulfide by hydrogen or other reducing gas, and the hydrogen sulfide is catalytically reacted with the smaller portion of sulfur dioxide to form elemental sulfur. Similarly, U.S. Pat. No. 3,495,941 discloses a process in which sulfur dioxide in regeneration off gas is catalytically reduced to hydrogen sulfide with hydrogen, a hydrogen-containing gas, or a hydrocarbon such as methane. The hydrogen sulfide can be reacted with sulfur dioxide to form elemental sulfur. U.S. Pat. No. 3,630,943 discloses the reduction of sulfur dioxide in a regeneration off gas stream to hydrogen sulfide and sulfur in a Claus plant.

Processes for reducing sulfur dioxide from other sources to elemental sulfur with other reducing agents are also known. In this regard, it should be noted that U.S. Pat. No. 2,148,258 describes a process in which part of the sulfur dioxide content of a gas obtained by acid sludge decomposition is reduced either catalytically or non-catalytically at temperatures not over 1200° F. to hydrogen sulfide and elemental sulfur, using a solid, liquid or gaseous reducing agent (e.g., carbon, hydrocarbons, or hydrogen) followed by catalytic conversion of hydrogen sulfide and unreacted sulfur dioxide to elemental sulfur. Similarly, U.S. Pat. Nos. 2,388,259 and 2,431,236 disclose processes in which sulfur dioxide in smelter gas (which also contains oxygen) is thermally reduced with natural gas, followed by passage of the thermal reactor effluent through a pair of catalytic converters in series to convert hydrogen sulfide and sulfur dioxide to elemental sulfur. U.S. Pat. No. 2,270,427 describes a system in which sulfur dioxide and added air are thermally reduced with methane, and in which the thermal reactor effluent is passed through a first stage COS coversion catalyst and then through a second stage $H_2S$ conversion catalyst, the second catalyst stage being operated below the dew point of elemental sulfur. U.S. Pat. No. 1,917,685 discloses a process comprising reducing sulfur dioxide in smelter gases with a carbonaceous reducing agent (e.g., water gas, producer gas, natural gas, or powdered coal) to elemental sulfur and hydrogen sulfide, quickly cooling the exit gas stream, condensing elemental sulfur therefrom, and catalytically converting $H_2S$, COS and $SO_2$ in the exit gas to form elemental sulfur.

U.S. Pat. No. 1,741,551 describes a process in which a gas containing $SO_2$ (e.g., smelter gas) is passed through a bed of incandescent solid carbonaceous fuel, the resulting gas mixture is reacted with additional $SO_2$ in a combustion chamber to form a gas mixture containing sulfur vapor, and any $H_2S$ and $SO_2$ in the combustion chamber effluent gas is catalytically converted to elemental sulfur by reaction in a "hot" catalyst bed at temperatures above 300° C. followed by reaction in a "cold" catalyst bed at 125°–200° C. In the process disclosed in U.S. Pat. No. 1,773,294, an $SO_2$-containing gas is reduced with an incandescent carbonaceous fuel followed by reaction of the resulting gas mixture with additional $SO_2$ in a combustion chamber. The combustion chamber effluent is either catalytically treated at 280°–350° C., or cooled to condense elemental sulfur and catalytically treated at about 120°–200° C. T. F. Doumani et al, *Industrial and Engineering Chemistry*, Vol. 36, No. 4, pp. 329–332 (April 1944) discloses a process in which sulfur dioxide in a waste gas stream is catalytically reduced to sulfur and hydrogen sulfide; the latter is reacted with additional sulfur dioxide to form elemental sulfur.

As a general proposition, it must be concluded that the prior art reducing agents are, basically, effective and that, indeed, any of the prior art reducing agents could be used to convert sulfur dioxide to hydrogen sulfide, elemental sulfur or to a mixture of both. The use of a carbonaceous reducing agent is, however, accompanied with an undesirable tendency to form soot, carbon oxysulfide and carbon disulfide as biproducts of the reducing reaction. These products are, of course, undesirable in that all will, to some extent, adversely affect the purity of the more desirable sulfur product or products. Moreover, soot will, generally, discolor the elemental sulfur product while the carbon oxysulfide and carbon disulfide, both of which are not easily converted to elemental sulfur, will decrease the yield thereof. Also, since the more preferred of the prior art reducing agents are gases, availability at the site and storage have created some problems with respect to use thereof.

Processes for the separation of sulfur dioxide from various gaseous mixture comprising the same are also well known in the prior art. Generally, these prior art processes involve first contacting the gaseous mixture with an absorbent which combines with the sulfur oxide to form either a solid or liquid and thus separates them from the gaseous mixture, followed by either disposal of the solid or liquid product or regeneration of the absorbent with the release of absorbed sulfur oxide. Such sulfur oxide removal processes have been classified as either "throw-away" processes or regenerative processes. Throw-away processes include, for example, processes in which sulfur oxides in a gas stream are reacted with calcium oxide (or calcium carbonate) and the resultant calcium sulfite and sulfate are discarded. Regenerative processes include both processes using a dry solid sorbent or acceptor, or a liquid (usually aqueous) scrubbing medium. An example of a dry solid sorbent is copper oxide on alumina which is described in British Patent 1,089,716. Other regenerative processes use a liquid and usually aqueous scrubbing medium which is capable of reacting with $SO_2$ (and $SO_3$ when present), followed by regeneration of the scrubbing medium. The use of ammonia in an aqueous medium for removing sulfur oxides from gases has been suggested in a number of references, and equilibria in the system $SO_2$-$NH_3$-$H_2O$ have been reported in detail by H. F. Johnstone, Industrial & Engineering Chemistry, volume 27, page 587 (1935) and ibid, Volume 30, page 101 (1938). Examples of references describing the scrubbing of an $SO_2$-containing gas stream with aqueous ammonia (either as ammonium hydroxide, ammonium sulfite, or ammonium sulfite-bisulfite) with liberation of sulfur dioxide on regeneration, include U.S. Pat. Nos 2,134,481 (Johnstone), 2,405,747 (Hixson et al), and 3,645,671 (Griffin et al). The sulfur dioxide stream liberated on regeneration of the absorbent solution has a much higher concentration of $SO_2$ than the original flue gas stream. This sulfur dioxide is then converted to sulfuric acid by known means, although, as indicated previously, processes have been suggested to reduce such $SO_2$ to $H_2S$ or elemental sulfur. The spent scrubbing solution in these references is regenerated and reused for scrubbing further quantities of sulfur dioxide containing gas.

It is known that the quantity of sulfur oxides in a gas stream can be reduced by injecting gaseous ammonia into the gas stream. Such processes are disclosed, for example, in *Chemical and Engineering News*, Sept. 11, 1972, pp. 54 and 56, and in C. C. Shale et al, "Removal of Sulfur and Nitrogen Oxides from Stack Gases by Ammonia," AIChE Chemical Engineering Progress Symposium Series No. 115, Vol. 67, pages 52–58 (1971).

A principal problem associated with the prior art processes, however, is that a multiplicity of treating agents are, generally, required. For example, in some processes one treating agent, e.g. CuO, might be used as the absorbent, a second treating agent; e.g. hydrogen, might be used to regenerate the absorbent, and a third treating agent; e.g. methane, might be used to reduce the sulfur dioxide liberated in the regeneration step. Such multiple use does, of course, further complicate those problems associated with availability at the site as well as those problems associated with storage at the site once the treating agents are there available.

The need, then, for a reducing agent which, when not readily available at the site of intended use, might be conveniently transferred and stored thereat is believed to be readily apparent. Similarly, the need for a process which will, effectively, permit the separation of sulfur dioxide from a gaseous mixture containing the same and the subsequent reduction thereof to either elemental sulfur, hydrogen sulfide or a mixture of both with a single treating agent is also believed to be readily apparent.

SUMMARY OF THE INVENTION

It has now been surprisingly discovered that the foregoing and other disadvantages associated with the prior art reducing agents as well as the disadvantages of the prior art methods for separating sulfur dioxide wherein a multiplicity of treating agents are used can be avoided with the reducing agent and the method of separation of this invention. It is, therefore, an object of one embodiment of this invention to provide an improved reducing agent for the reduction of sulfur dioxide. It is another object of one embodiment of this invention to provide such a reducing agent which can be used without the production of soot, carbon oxysulfide or carbon disulfide. It is still another object of this embodiment of the invention to provide such a reducing agent which can be conveniently transported and stored as a liquid. It is, on the other hand, an object of a second embodiment of this invention to provide an improved method for separating sulfur dioxide from a gaseous mixture comprising the same. It is another object of this second embodiment of the invention to provide such a method wherein a single treating agent can be used to accomplish both the separation of sulfur dioxide from a gaseous mixture comprising the same and the subsequent reduction thereof. These and other objects and advantages will become apparent for the disclosure set forth hereinafter and the appended drawing.

In accordance with the present invention, the foregoing and other objects and advantages are accomplished, in a first embodiment, by reducing sulfur dioxide with ammonia, and, in a second embodiment, by using ammonia as the sole treating agent. In the first embodiment, the reduction will be accomplished by contacting the ammonia and sulfur dioxide in a suitable manner and effecting the desired reaction either thermally or catalytically. In the second embodiment, ammonia is used as the absorbent and various ammonium salts are formed during the absorption step. These ammonium salts may then be decomposed so as to yield sulfur and/or hydrogen sulfide or into a mixture comprising ammonia and sulfur dioxide. This mixture can then be reacted in the same manner as in the first embodiment, i.e. either thermally or catalytically, to yield sulfur and/or hydrogen sulfide.

DETAILED DESCRIPTION OF THE INVENTION

Broadly, the method of reducing sulfur dioxide of this invention can be used to reduce sulfur dioxide from essentially any source to sulfur and/or hydrogen sulfide. Such sources include, but are not necessarily limited to, flue gases, gases obtained from acid sludge decomposition, smelter gases and the like. Generally, however, the sulfur dioxide will first be separated from these gases, which gases will, generally, contain oxygen and/or other materials which might interfere with the reduction, with methods known in the prior art and then contacted with the ammonia reducting agent. Generally, then, the reduction will be accomplished with a gas stream or gaseous mixture comprising sulfur dioxide, generally at a higher concentration than in the source gas and, generally, free of undesirable components such as oxygen and the like. The actual concentration of sulfur dioxide is, of course, not critical. Notwithstanding this, however, it is desirable to have the sulfur dioxide concentration as high as possible so as to minimize heat requirements. For this reason, then, the sulfur dioxide concentration in the gaseous mixture to be treated should be at least 10 mol %, preferably at least 20 mol % and most preferably at least 50 mol %.

The reducing method of this invention is particularly useful in the reduction of sulfur dioxide to sulfur and/or hydrogen sulfide contained in a sulfur dioxide-rich regeneration off gas streams obtained by the regeneration of a solid sulfur dioxide removal sorbent. Flue gas desulfurization processes (i.e., processes for selective removal of sulfur oxide from flue gas) employing solid sorbents which are regenerated with reducing gas are described, for example, in British Patent No. 1,089,716, in U.S. Pat. No. 3,495,941 supra, and in Chemical Engineering Progress, 67, No. 8, 86–91 and (1971) supra. The regeneration off gas typically contains at least about 10% by volume of sulfur dioxide, plus small amounts of reducing components. Other sulfur dioxide-rich gas streams can also be treated according to this invention. The sulfur dioxide-rich stream preferably is substantially devoid of free oxygen.

The reducing gas in the process of this invention is an ammonia-rich gas which may be either substantially pure ammonia or a gas mixture comprising a major proportion of ammonia. A preferred ammonia-rich gas stream will contain no more than minor amounts of carbon monoxide and/or hydrocarbons. Moreover, the ammonia-rich gas stream will preferably be substantially free of any hydrocarbons higher than methane.

The chemical reactions involved in the reduction of sulfur dioxide with ammonia and which are of interest with respect to the present invention are the following:

$$4NH_3 + 2SO_2 \rightarrow 2N_2 + 2H_2S + 4H_2O; \quad (1)$$

$$2H_2S + SO_2 \rightarrow 3S + 2H_2O; \quad (2)$$

$$4NH_3 + 3SO_2 \rightarrow 2N_2 + 3S + H_2O; \quad (3)$$

Equation (3) is, of course, simply the sum of Equations (1) and (2).

As in the case of other sulfur dioxide reduction reactions, the reduction with ammonia is highly exothermic. It is, then, possible to effect the reduction thermally and autogenously (autothermally) through a proper control of reactant concentrations. Generally, the reduction will proceed, thermally, at a temperature above about 1200° F. and preferably at a temperature within the range of about 1500° F. to about 3000° F. and the same will proceed autoenously with feed at a lower temperature when the heat of reaction is equal to the sum of any heat loss from the reactor plus any change in the sensible heat of the components fed to the reactor. The compositions and inlet temperatures may then be varied to achieve any reaction temperature within the stated range and, as indicated, supra, the temperature in the reduction reactor will be determined, primarily, by the concentrations of ammonia and sulfur dioxide in the feed gas streams, and by the respective inlet temperatures of these streams. Preferably, the feed streams will have sufficient concentrations of ammonia and sulfur dioxide such that the reactor does not require extraneous heat, e.g., hot combustion gases or external fuel and air, except during startup, in order to maintain a self-sustaining reaction. Moreover, the process will not depend upon molecular oxygen contained in either feed stream to supply heat, since ordinarily both feed streams, i.e. the ammonia stream and the SO$_2$ stream, are essentially devoid of molecular oxygen.

It will, of course, be appreciated that the autothermal reaction can be carried out at any desired pressure ranging from a slight superatmospheric pressure (e.g., about 5–10 psig in the thermal reactor) sufficient to overcome the pressure drop in the process to several atmospheres. It will also be appreciated that the process gas stream produced in the reduction reactor can be cooled, preferably in a waste heat boiler, to condense elemental sulfur.

When dilute feed gas streams, i.e. either the ammonia-containing gas stream or the sulfur dioxide containing gas stream or both, are used, difficulty may be encountered in maintaining a self-sustaining reaction in the thermal reactor. In these situations, thermal reduction can still be achieved, but extraneous heat will be required so as to maintain the reduction temperature with the aforespecified ranges; viz., above about 1200° F. and preferably within the range from about 1500° F. to about 3000° F. Alternatively, such dilute streams could be contacted with any of the catalyst known in the prior art to be effective in the reduction of SO$_2$ with hydrogen. These include, but are not necessarily limited to, the transition metals or transition metal oxides such as chromium, cobalt, nickel, molybdenum, vanadium, manganese, tungsten, palladium and zinc and the oxides thereof. These catalysts, when used will, of course, generally, be supported on a suitable carrier such as alumina. Still further examples of suitable catalysts are activated bauxite, other silica based catalyst and activated carbon catalyst. Co/Mo on alumina is, of course, particularly effective and is widely used commercially in various reduction type reactions.

It will, of course, be appreciated that concentrated feed streams could also be contacted in the presence of any one or more of the aforementioned catalysts and the reduction accomplished catalytically therewith. Due to the exothermic nature of the reaction, however, staging and/or cooling will be required so as to avoid temperature runaways which might adversely affect the particular catalyst actually used. In either case, i.e. in catalytically treating either dilute or concentrated reactant streams, the reduction temperature will be controlled, generally, within the range from about 500° F. to about 2000° F. and preferably within the range of from about 900° F. to about 1500° F.

Generally, the reaction between the ammonia-containing gas and the sulfur dioxide-containing gas according to the present invention produces a process gas stream which contains elemental sulfur, hydrogen sulfide, unconverted sulfur dioxide, and water vapor, and which may also contain minor amounts of other constituents, such as carbon oxysulfide and carbon disulfide. This process gas stream may, then, be cooled in order to condense water and elemental sulfur, which sulfur may conveniently be separated as a liquid from the gas stream. The uncondensed portion of the process stream, which will comprise, principally, the H$_2$S and SO$_2$ may then be fed to a conventional type Claus plant. As is well known, the feed to a Claus plant will, generally, contain H$_2$S and SO$_2$ in a mol ratio of 2:1. Any deviation from this ratio in the uncondensed portion of the process gas should, then, be corrected with additional H$_2$S and/or SO$_2$, as required. Alternatively, the relative concentrations of ammonia and sulfur dioxide to the reduction reaction and/or the temperature thereof can be controlled so as to yield the proper $H_2S/SO_2$ ratio in the process stream.

When the uncondensed portion of the process gas stream is fed to a conventional Claus plant, the same will, generally, be treated in a plurality of catalytic conversion stages in order to convert the hydrogen sulfide and sulfur dioxide contents thereof to elemental sulfur. Each catalytic conversion stage includes a catalytic converter which will, generally, contain a known Claus conversion catalyst, such as alumina or bauxite, followed by a condenser in which the gas stream is cooled and the elemental sulfur in the stream is condensed as liquid sulfur and removed. Each conversion stage will also generally include a reheater which precedes the catalytic converter, in order to bring the inlet temperature of the gas stream as it enters the catalytic converter up to the desired temperature. It is important to maintain the gas temperature above the condensation point of sulfur in the catalytic converters and in all parts of the system except the sulfur condensers.

The effluent gas from the last stage will also be cooled to condense elemental sulfur, which is in turn removed. The remaining gas, i.e., the tail gas, may be incinerated to convert all sulfur species (i.e., hydrogen sulfide, elemental sulfur, carbon oxysulfide and carbon disulfide) to sulfur dioxide. In flue gas desulfurization installations, the incinerated gas is preferably recycled to the flue gas stream. Alternatively, the incinerated gas may be discharged into the atmosphere after treatment, if necessary, to reduce the sulfur content to a level acceptable from the air pollution standpoint.

As indicated previously, the sulfur dioxide treated in accordance with the present invention may be derived from essentially any source. Moreover, the same may contain sulfur trioxide, which trioxide will be reduced to either elemental sulfur or $H_2S$ or both in substantially the same manner as the sulfur dioxide. In a most preferred embodiment of the present invention, however, the sulfur dioxide (and sulfur trioxide when present) will be obtained by separation from a flue gas stream and ammonia will be used as the absorbent in the separation of the $SO_2$ from the flue gas. The ammonium salts thus obtained will then be decomposed directly to sulfur and/or hydrogen sulfide or to a mixture comprising $SO_2$ and $NH_3$, which mixture will then be reacted either thermally or catalytically to yield elemental sulfur and/or hydrogen sulfide.

In this embodiment of the invention, sulfur oxides, (sulfur dioxide, sulfur trioxide, or mixtures of both) in a gas stream such as flue gas or smelter gas, are converted into elemental sulfur by an oxidation-reduction reaction with ammonia. This embodiment includes two major operations. First the gas stream containing sulfur oxides is treated with ammonia in order to remove the sulfur oxides therefrom, and the resulting ammonium salts (ammonium sulfite, ammonium bisulfite, ammonium sulfate, ammonium bisulfate, or a mixture thereof) are separated from the gas stream. Second, the separated ammonium salts are decomposed via an oxidation-reduction reaction into products comprising elemental sulfur and elemental nitrogen.

There is no reference in the literature indicating that the high temperature decomposition of ammonium sulfite or sulfate salts leads to the production of elemental sulfur, $H_2S$, water and nitrogen. While many reducing agents for $SO_2$ have been suggested and are reported in the literature ($H_2$, CO, $CH_4$, $H_2S$ of course), $NH_3$ has never been tried. Briner reports in J. Chim. Phys. 4, 267–284 (1906) that anhydrous $NH_3$ and $SO_2$ react at low temperature to form an orange solid of compositions $SO_2NH_3$, which decomposes upon heating with the release of sulfur and nitrogen, but he states that there is no evidence for this reaction between gaseous $NH_3$ and $SO_2$, and certainly did not have the ammonium sulfite salts as starting materials in his reaction scheme.

In this embodiment of the present invention, the initial gas stream containing sulfur oxides is first treated with ammonia either by scrubbing the gas stream with an aqueous medium (solution or slurry) containing ammonia, by injecting ammonia into the gas stream, or by a combination of the two. The ammonia in the scrubbing solution or slurry may be in the form of ammonium hydroxide (or dissolved ammonia), ammonium sulfite, a mixture of ammonium sulfite and bisulfite, or other ammonia salt or salt mixture which is capable of reacting with sulfur dioxide. Ammonia which is injected into the gas stream is preferably gaseous ammonia, but may be an aqueous ammoniacal solution similar to the above-described scrubbing solution. Both ammonia injection and scrubbing with an aqueous ammonia solution are known methods in the art for removing sulfur oxides from flue gas, as shown, for example, in the references cited earlier. Treatment with ammonia is ordinarily carried out at a temperature below about 400° F., and the initial gas stream may be cooled by conventional means, such as quenching with an aqueous medium, where necessary.

The basic process of this embodiment may also include the step of quenching the hot flue gas and removing fly ash therefrom prior to scrubbing with aqueous ammonia. These steps can, however, also be carried out according to known techniques. Fly ash removal can be carried out by electrostatic precipitation, cyclone separation, or bag filtering of the essentially dry solid from the gas. Alternatively, fly ash can be removed simultaneously with $SO_x$ removal by the liquid scrubbing medium.

Treatment with ammonia removes most of the sulfur oxides and part of the nitrogen oxides (when present) in the initial gas stream. The treated gas stream is generally discharged into the atmosphere and typically containing 10% or less of the $SO_2$ initially present, and little or no $SO_3$ or ammonia. Ammonia treatment results in the formation of ammonium salts of sulfur acids, i.e., at least one salt of the group consisting of ammonium sulfite, ammonium bisulfite, ammonium sulfate, and ammonium bisulfate. Sulfur dioxide in the gas stream leads to the formation of sulfites, with some sulfate formation when oxygen is also present; sulfur trioxide leads to the formation of sulfates, as is well known. Some ammonium nitrate and/or ammonium nitrite may also be formed due to the partial removal of nitrogen oxides from the gas stream. These ammonium salts are separated from the gas stream, either in the dry state or in an aqueous liquid medium, such as the aqueous solution or slurry resulting from the above-described gas scrubbing operation. When the separated ammonium salts are in aqueous medium, it is desirable to remove at least a substantial portion of the water associated with the ammonium salts prior to decomposition thereof.

The $NH_3/SO_x$ mole ratio in the separated ammonium salts should be at least equal to the stoichiometric quantity for conversion of the chemically combined sulfur in the separated ammonium salts to elemental sulfur. The $NH_3/SO_x$ mole ratio should be at least 4/3, which is the stoichiometric ratio when all of the combined sulfur in the salts is present as sulfites (i.e., ammonium sulfite or a mixture of ammonium sulfite and bisulfite). When all of this sulfur in the separated salts is present as sulfate, the stoichiometric ratio is 2/1. When treating flue gas (in which approximately 3–10% of the $SO_x$ content is $SO_3$, the rest $SO_2$), an $NH_3/SO_x$ mole ratio in the separated salts of about 1.5 is preferred. Greater than stoichiometric quantities of ammonia can be present without harmful effect. For example, when it is desired to remove substantial quantities of nitrogen oxides in addition to sulfur oxides from the gas stream, additional ammonia must be added to react with $NO_x$, and the $NH_3/SO_x$ mole ratio in the separated salts may be as high as 2/1 or even higher.

Separated ammonium salts are decomposed via high temperature oxidation-reduction reaction into a reaction product mixture comprising elemental nitrogen and at least one member of the group consisting of sulfur and hydrogen sulfide. Decomposition of the ammonium salts can be carried out in either one or two steps. In the one step method, the ammonium salts are fed directly into a high temperature reaction zone which is maintained at a temperature of about 500° to about 3000° F., preferably about 900° to about 1500° F. This reaction zone preferably contains a catalyst, which may be an activated bauxite. Alternatively, other silica based catalysts or activated carbon catalysts may be used. The catalyst may be dispensed with at temperatures toward the upper end of the broad range.

The two step decomposition, which is ordinarily preferred, differs from the one step decomposition in that the ammonium salts are first thermally decomposed into a gaseous mixture comprising ammonia, sulfur oxides ($SO_2$ and/or $SO_3$), and water vapor. This gas mixture (or the ammonia and sulfur oxides therein, after removal of the water vapor, if desired) is then introduced into a high temperature reaction zone where the reduction is accomplished either thermally or catalytically in a manner heretofore described. When sulfates (which decompose at higher temperatures than sulfites) are present in the separated ammonium salts, the thermal decomposition can be operated at temperatures sufficiently high to cause decomposition of both sulfites and sulfates, or alternatively these salts can be decomposed at a somewhat lower temperature sufficiently high to cause decomposition of the sulfites while leaving a residue comprising the sulfates.

The reaction product of the oxidation-reduction reaction zone comprises elemental nitrogen and at least one member of the group consisting of elemental sulfur and hydrogen sulfide. Even when the stoichiometric quantity of ammonia is present in the oxidation-reduction zone feed, the reaction product mixture contains elemental sulfur, hydrogen sulfide, and unreacted sulfur dioxide, with an $H_2S/SO_2$ mole ratio of approximately 2/1. When an excess of ammonia is used, more hydrogen sulfide and less unreacted sulfur dioxide (or none) are present in the reaction product mixture; this reaction product mixture may contain elemental sulfur and $H_2S$, with little or no $SO_2$. The use of low temperatures within the broad operating range in the presence of a catalyst (and with stoichiometric or near stoichiometric quantities of ammonia) favors the formation of elemental sulfur and lessens the amount of hydrogen sulfide formed.

To enhance the yield of elemental sulfur, the hydrogen sulfide in the reaction product mixture from the oxidation-reduction zone may be catalytically reacted with sulfur dioxide via the Claus reaction in one or more stages to produce further quantities of elemental sulfur. The $SO_2$ for this reaction may be unconverted $SO_2$ from the decomposition of the original ammonium salt, or extraneous $SO_2$ added to the reaction product mixture to adjust the $H_2S/SO_2$ ratio to the desired value of 2/1. Addition of an oxygen-containing gas to the reaction product mixture or decomposer will have an effect similar to $SO_2$ addition, as it will convert some of the $H_2S$ and sulfur formed to $SO_2$.

The Claus reaction is exothermic, since $S_8$ is produced, and is carried out in the presence of a catalyst, preferably activated bauxite, as is well known. Suitable reaction temperatures for this step are about 400° to about 750° F. The high temperature reaction and the subsequent catalytic Claus conversion can be carried out either in separate reactors or in a single reaction vessel, as desired. Even when a single reaction vessel having no physical divider between the high temperature zone and the subsequent lower temperature catalytic conversion zone is used, two reaction zones will be established, even though there may be no precise boundary between them. In the first zone, the reaction between $NH_3$ and the sulfur oxide occurs, while the second zone is essentially a clean-up step to drive the Claus reaction as much as possible to completion. Intermediate removal of elemental sulfur, and water, may be advisable before the final, low temperature Claus reaction step to ensure as complete a conversion of sulfur oxides and $H_2S$ as possible.

When the oxidation-reduction reaction is carried out at low temperatures which favor the direct formation of elemental sulfur, it may be possible to dispense with the Claus conversion stages.

While the process of the present invention is generally applicable to the treatment of gas streams containing sulfur dioxide and/or sulfur trioxide, the invention will be described with particular reference to the treatment of flue gas. The flue gas referred to here is a gas produced by combustion of a sulfur-containing fuel (e.g., coal or fuel oil) and ordinarily contains, besides nitrogen, water vapor, and carbon dioxide, some molecular oxygen (due to use of excess air) plus small amounts (typically about 0.2–0.3% by volume, the quantity depending on the quantity of sulfur in the fuel) of sulfur oxides, of which not more than about 10% (typically approximately 3–10%) is in the form of $SO_3$, the rest as $SO_2$. Flue gas may also contain fly ash, particularly when coal is used as the fuel.

In the preferred basic process of this invention, flue gas, or other gas streams containing sulfur oxides (sulfur dioxide and/or sulfur trioxide), such as ore roasting gases, is scrubbed with an aqueous medium containing ammonia, resulting in the formation of ammonium salts, i.e., ammonium sulfite, ammonium bisulfite, as well as some ammonium sulfate. Most of the sulfur oxides present, as well as some nitrogen oxides, are removed from the gas in this manner. The resultant ammonium salts in aqueous solution or slurry are separated from the gas stream. The separated ammonium salt solution or slurry usually contains a large quantity of water, which is at best an undesirable diluent in the oxidation-reduction reaction between ammonia and sulfur oxides. In the Claus equilibrium between $SO_2$ and $H_2S$, water is an end product and, therefore, suppresses the formation of elemental sulfur formed according to the equation $$SO_2 + 2H_2S \rightleftarrows 2H_2O + 3S$$

Accordingly, some water removal is desirable before going into the oxidation-reduction converter. A large part of this water can be evaporated and removed prior to decomposition of the ammonium salts, if desired. As much water as possible is removed by evaporation at low temperature, e.g., about 250° F.

The ammonium salts are then thermally decomposed to yield a gas mixture comprising ammonia, sulfur oxides, and water vapor. This vapor mixture, containing principally $SO_2$, ammonia, and water vapor, is heated and passed into a high temperature reaction zone, preferably in the presence of a catalyst, such as activated bauxite, thereby causing an oxidation-reduction reaction between ammonia and sulfur oxides to take place with the formation of a reaction product gas mixture containing elemental sulfur, nitrogen, and water vapor. As indicated previously, the temperature in this high temperature reaction zone is about 500°–3000° F. and preferably about 900°–1500° F. when a catalyst is employed. This reaction product gas mixture will usually also contain hydrogen sulfide and may contain small amounts of sulfur dioxide. This reaction product gas mixture may be passed into contact with a Claus conversion catalyst (e.g., activated bauxite) in one or more stages (typically about 400°–750° F.) at lower temperatures than that prevailing in the high temperature reaction zone in order to cause reaction of hydrogen sulfide and sulfur dioxide to form further quantities of elemental sulfur. Use of more than one stage will insure a high degree of conversion to elemental sulfur.

The above-described high temperature reaction zone preferably contains a catalyst, which may be activated bauxite, other silica-based catalyst, or activated carbon. An oxidation-reduction reaction takes place in this high temperature reaction zone, at temperatures in the range of about 500° to 2000° F., but preferably 900° to about 1500° F., resulting in the formation of elemental sulfur and hydrogen sulfide. Even when the stoichiometric quantity of ammonia for conversion of all $SO_2$ present to elemental sulfur is present, some elemental sulfur and hydrogen sulfide are formed, and some unreacted sulfur dioxide remains. The remaining $SO_2$ will amount to half the $H_2S$ formed in the $NH_3$–$SO_2$ interaction, and can be converted to elemental sulfur by the Claus reaction previously cited. The principal reactions taking place in the high temperature reaction zone are given by equations 1, 2 and 3 below:

$$3SO_2 + 4NH_3 \rightarrow 6H_2O + 2N_2 + 3S \quad (1)$$

$$SO_2 + 2NH_3 \rightarrow 2H_2O + N_2 + H_2S \quad (2)$$

$$SO_3 + 2NH_3 \rightarrow 3H_2O + N_2 + S \quad (3)$$

and, of course, the Claus equation between $H_2S$ and $SO_2$ to form elemental sulfur.

Various modifications of the basic process can be made without departing from the scope of this invention. It has already been stated that the treatment of the sulfur oxide-containing gas stream with ammonia can be accomplished by injecting ammonia into the gas stream or by a combination of ammonia injection and scrubbing with ammonia in an aqueous medium, rather than merely by scrubbing with ammonia in an aqueous medium as described above. For example, sulfur oxides can be removed from the gas stream by injecting ammonia into the gas stream and by reducing the temperature of the gas stream, e.g., by quenching with water, to a temperature at which ammonium sulfite and/or bisulfite will form. The gas stream is preferably, but not necessarily, quenched to below about 150° F. and preferably to about 130° F. It is preferred to inject the ammonia upstream of quenching, in order to minimize the formation of acids (sulfuric or sulfurous acid) in quenching and thereby minimize corrosion. An alternative mode of operation is to use a combination of ammonia injection and scrubbing in order to remove sulfur oxides. In such a mode of operation, one may inject ammonia into the gas stream and then inject the scrubber effluent medium (solution or slurry) containing ammonium salts (e.g. ammonium sulfite and bisulfite) into the flue gas stream ahead of the scrubber, thereby quenching the hot flue gas to a temperature below about 150° F. and evaporating large quantities of water in the effluent solution or slurry. This will form solid ammonium sulfite and bisulfite in granular form or highly concentrated slurry of the salts in aqueous medium which are easily recovered by conventional means. The solid granular ammonium salts or thickened slurry are separated from the gas stream before the gas enters the scrubber zone, and the separated salts are then decomposed into ammonia, sulfur dioxide, and water as has been previously described. When operating according to this mode of operation, fly ash may be recovered either by conventional means (e.g., water spraying followed by cyclone and/or electrostatic precipitators or bag filters) ahead of the ammonia injection, or alternatively, the fly ash and the ammonium salts can be separated together, e.g., in a cyclone, spray dryer, gas filter, electrostatic precipitator or other conventional means of solid/gas separation.

PREFERRED EMBODIMENTS

Figure 1:
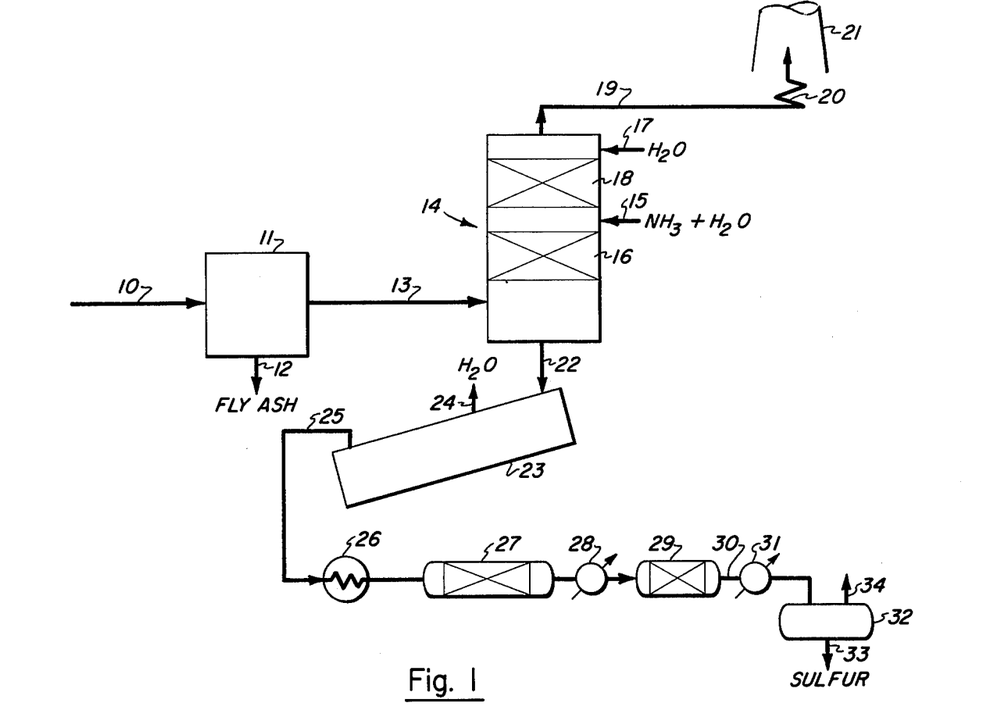
FIG. 1 is a diagrammatic flow diagram illustrating both the first and second embodiment of the present invention.

Having thus broadly described various embodiments of the present invention, it is believed that the present invention will become even more apparent by reference to the appended drawings which illustrate particularly preferred embodiments thereof. Referring then to FIG. 1, a flue gas stream 10, containing sulfur oxides ($SO_2$ and $SO_3$, principally the former) at a temperature of approximately 350° F. is passed through a fly ash removal and quench unit 11. The flue gas is quenched and fly ash removed in this unit by conventional means, as for example, by injecting a water spray sufficient to lower the temperature to approximately 130° F., and by separating the fly ash by conventional means, e.g., cyclones, electrostatic precipitators, or bag filters either before or after quenching. The separated fly ash is removed. The quenched flue gas stream 13 is passed to scrubber 14. The flue gas is first countercurrently contacted with an aqueous ammonia solution in $SO_x$ removal section 16 and then with water, admitted via inlet 17, in ammonia removal section 18. The term "aqueous ammonia solution" refers broadly to a solution which contains unneutralized ammonia, and encompasses aqueous ammonium hydroxide, aqueous ammonium sulfite, aqueous ammonium sulfite-bisulfite solutions, etc., all of which are known in the art. The aqueous medium admitted via line 15 is preferably a solution but may be a slurry containing dissolved as well as undissolved ammonium salts. Gaseous ammonia may also be injected via line 15. Scrubbed flue gas leaves the top of scrubber 14 via overhead line 19, and may then be reheated in a conventional reheater 20 and discharged to the atmosphere through stack 21. This flue gas contains only a small fraction, e.g., 10% or less of its original $SO_x$ content, and will ordinarily also have an $NO_x$ content lower than that of the entering flue gas. The overhead gas stream 19 is essentially free of $SO_3$ and ammonia.

The aqueous scrubber effluent medium, which may be either a solution or a slurry containing ammonium sulfite and ammonium bisulfite, and which may also contain ammonium sulfate, is separated from the flue gas stream and removed from the bottom of the scrubber through line 22. This aqueous scrubber effluent medium is fed into a heated rotary kiln 23. Preferably a large part of the water in the solution or slurry is evaporated at temperatures ranging from 150° F. to 300° F., preferably 175°–255° F., and taken off separately via line 24 before decomposition of the ammonium salts takes place. This water vapor leaving via line 24 will contain some $NH_3$ and $SO_2$ which it is desirable to recover. This is done by combining this vapor with feed to scrubber 14 where said recovery is accomplished. The ammonium salts are decomposed in the latter portion of kiln 23 at temperatures ranging from 225° F. to 800° F., preferably 250°–700° F., to yield a vapor mixture containing sulfur dioxide, ammonia, and water vapor. Sulfur trioxide may also be present in small amounts due to the presence of ammonium sulfate. In the process here illustrated, ammonium sulfite and ammonium sulfate are essentially decomposed completely into gaseous products, i.e., ammonia, the corresponding sulfur oxide, and water vapor. As explained earlier, the decomposition may be carried out at lower temperatures, say 225° to 500° F., so that some residue from the ammonium sulfate remains. The gas containing ammonia, $SO_2$, and water vapor is removed from kiln 23 via line 25, preheated in preheater 26 to a temperature of approximately 1200° F., and then passed into the high temperature reactor 27. It will, of course, be appreciated that the $SO_2$ (and $SO_3$ when present) which is fed to reactor or reduction unit 27 could be derived from any of the sources heretofore noted and that the same need not be mixed with ammonia at this point or contain ammonia at the desired concentration. In this regard, it will be appreciated that "make-up" ammonia could be added to the $SO_2$ or $SO_2$-ammonia mixture at essentially any point prior to the reactor 27 even though this is not illustrated in the Figure. It should be noted, however, that even when the $SO_2$ is not derived in the manner presently described, i.e. by absorption with ammonia, the same may already be mixed with sufficient ammonia to effect the desired reduction. For example, when the $SO_2$ is absorbed with a supported metal oxide sorbent such as CuO, the supported sorbent could be regenerated with an excess of ammonia and, indeed, this would be a preferred mode of operation with sorbents of this type.

Preferably, the reactor 27 will contain a catalyst such as cobalt-molybdenum on alumina or activated bauxite, especially when dilute feed streams are treated, and the temperature will be maintained within a range from about 500° F. to about 1500° F. When concentrated feed streams are treated, on the other hand, the reduction will, preferably, be effected thermally at a temperature within the range of about 1500° F. to about 3000° F. In either case, an oxidation-reduction reaction will take place in the reactor with the formation of a reaction product mixture containing elemental sulfur, hydrogen sulfide, unreacted sulfur dioxide, nitrogen, and water vapor. This reaction is exothermic. The reaction product mixture may then be cooled in cooler 28 to a suitable Claus reactor inlet temperature, e.g., about 500°–600° F., and then may be passed through one or more Claus reactors 29 containing a suitable catalyst such as activated bauxite. Hydrogen sulfide and sulfur dioxide react in a 2/1 mole ratio in the Claus converters 29 to form further quantities of elemental sulfur. The Claus reactor effluent stream 30 is cooled in cooler 31 and passed to separator drum 32. Liquid elemental sulfur 33 and the Claus unit tail gas stream 34 are taken off separately from drum 32. This tail gas stream 34 may be returned to the scrubber 14 if desired in order to scrub out $SO_2$ as well as $H_2S$ prior to discharging into the atmosphere.

Figure 2:
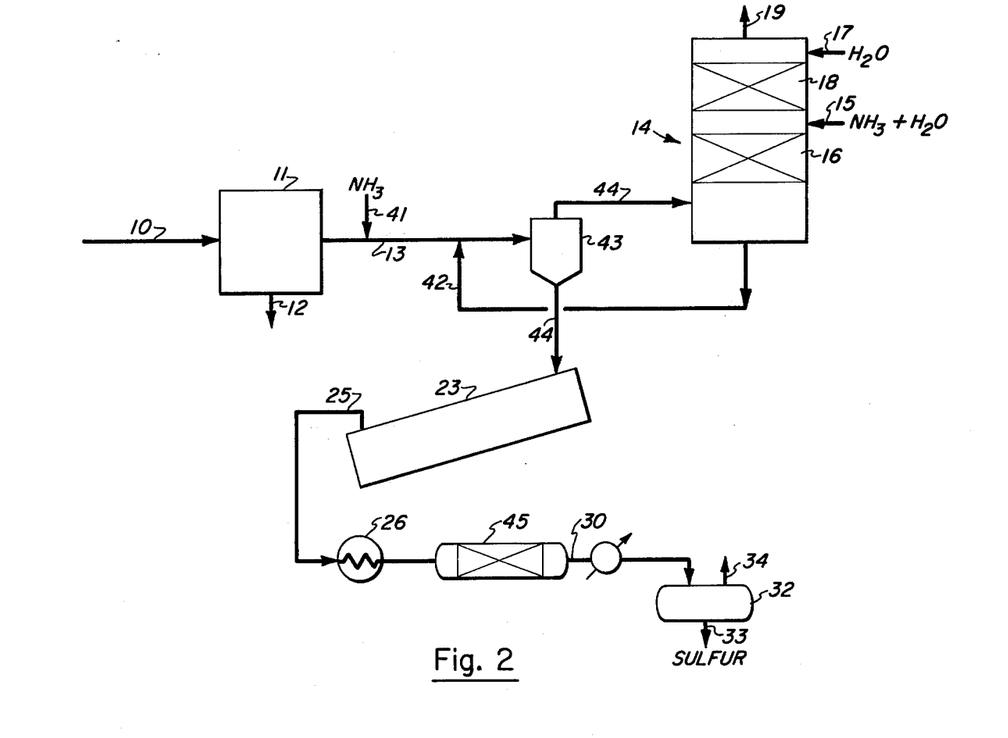
FIG. 2 is a flow sheet of a modified form of the second embodiment of the present invention.

Turning now to FIG. 2 there is illustrated a modified form of the present invention in which sulfur oxides are removed from flue gas by a combination of ammonia injection and scrubbing. Like parts have the same reference numerals as in FIG. 1.

As illustrated, then, a flue gas stream 10, typically at a temperature of about 350° F., is passed through fly ash removal unit 11 where fly ash is removed by conventional means. The discharged fly ash 12 is separated. A stream of anhydrous ammonia 41 is injected into the flue gas stream 13. Downstream of the ammonia injection, the aqueous scrubber effluent medium, which is a solution or slurry containing ammonium bisulfite and ammonium sulfite (and, in some cases, ammonium sulfate as well) is injected into the flue gas stream via line 42. The water content of this aqueous medium is substantially evaporated. This also cools the flue gas stream to a suitable temperature for reaction between ammonia and sulfur oxide, e.g., approximately 130° F. Ammonium salts, i.e., ammonium sulfite, ammonium bisulfite, and ammonium sulfate when present, are separated from the flue gas stream in cyclone 43. The flue gas, from which a large portion of the sulfur oxides have already been removed, passes via overhead line 44 to scrubber 14. This scrubber is similar to the scrubber 14 of FIG. 1, and the detailed description of its operation will not be repeated. Desulfurized gas 19 is removed overhead from the scrubber. The liquid scrubber effluent 42 is injected into the flue gas stream upstream from the scrubber as has already been described. The solid ammonium salts which are separated in cyclone 43 are removed therefrom through line 44. These solid salts are fed into rotary kiln 23, where they are decomposed into a gaseous mixture containing $SO_2$, ammonia and water vapor, which mixture is discharged from the kiln via line 25. The operation of kiln 23 in FIG. 2 differs from that in FIG. 1 in that there is little or no water of solution associated with the salts to be decomposed; hence, water overhead line 24 can be omitted, or the quantity of water taken off via such a line can be sharply reduced, limited solely to water of hydration of the salts and some residual water adhering to the separated crystals. The gas mixture in line 25 may be preheated in preheater 26, and passed into reactor 45, again, will preferably contain a catalyst, especially when treating relatively dilute streams, but which will, preferably be operated without a catalyst when treating relatively concentrated streams. In either case, the temperatures will be as heretofore indicated. The concentrations at which the break in preference between catalytic and thermal reduction occurs is, of course, not clear cut since the relative advantages of both methods of operation depend upon such factors as the heat capacity of any other components in the feed stream and the maximum temperature and/or temperature variation which can be tolerated by the catalyst actually employed and the equipment in which the reduction is accomplished. Nonetheless, it can be generally concluded that any feed comprising 50 mol % or more $SO_2$ would be advantageously reduced thermally. In the embodiment illustrated, both the previously described oxidation-reduction reaction and the Claus reaction take place in reactor 45, giving an effluent stream 30 which contains elemental sulfur, nitrogen, and water vapor, but only small amounts of $H_2S$ AND $SO_2$. Any hydrogen sulfide formed as a product of the oxidation-reduction reaction in reactor 45 may be converted to elemental sulfur by the Claus reaction is the latter portion of reactor 45, which may be maintained at a temperature of 400°–750° F. Liquid elemental sulfur 33 and a tail gas stream 34 are obtained as described in FIG. 1.

The ammonia-sulfur oxide-water vapor mixture 25 in FIG. 2 can be further treated as shown in FIG. 1 if desired. Likewise, the gaseous mixture 25 in FIG. 1 can be treated as shown in FIG. 2 if desired.

Figure 3:
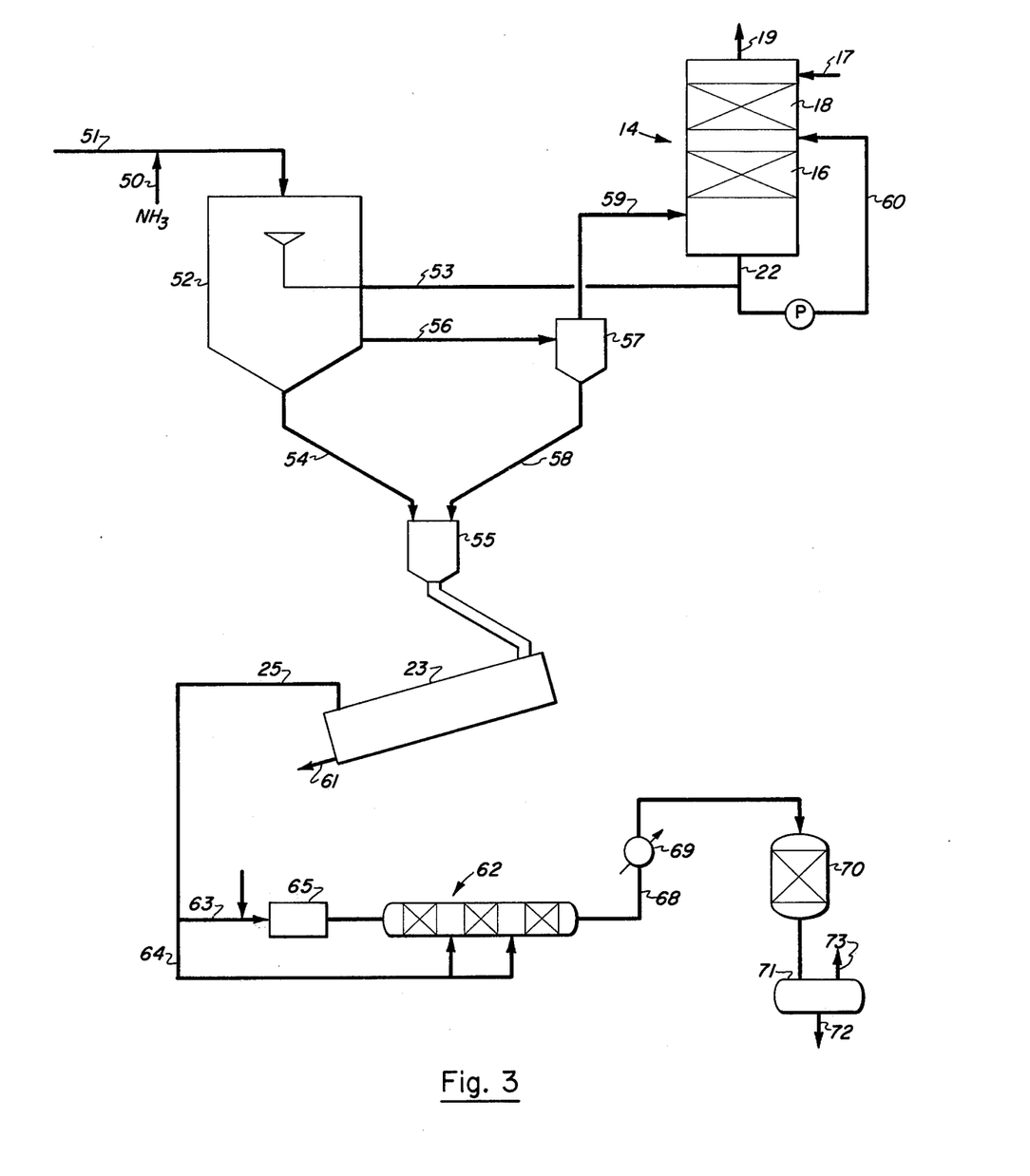
FIG. 3 is a flow sheet of another modified form of the second embodiment of the present invention.

Turning now to FIG. 3, there is illustrated a still further modified form of the present invention in which fly ash and ammonium sulfites are recovered together rather than separately as in FIGS. 1 and 2. Also, FIG. 3 illustrates a modified procedure for converting the gas stream containing $SO_2$, ammonia, and water vapor, obtained by decomposition of the ammonium sulfites, into elemental sulfur. As illustrated in FIG. 3, then, ammonia is injected via line 50 into a fine gas stream 51 which is at a temperature of approximately 350°–400° F. This flue gas stream with added ammonia is fed into spray dryer 52. A portion of the scrubber effluent solution from scrubber 14, containing ammonium sulfite and ammonium bisulfite (and optionally ammonium sulfate) in an aqueous solution or slurry, is injected into the flue gas stream in spray dryer 52 via line 53. Injection of the aqueous solution or slurry into the hot, dust-laden gas stream will act to coagulate the fine dust particles, a salt matrix will stay behind essentially gluing the fine dust particles together into larger agglomerates. This makes fly ash recovery much easier than attempting to recover unagglomerated fines.

In addition, any fly ash particles which escape this recovery step will be picked up on the subsequent liquid scrubbing step and will become part of the circulating liquor and in turn will become incorporated into the above-mentioned agglomerates when the water evaporates from the spray dryer particles. Some fly ash and solid ammonium salts are separated from spray dryer 52, and are conveyed via line 54 to a collecting bin 55. The flue gas stream 56 containing some entrained fly ash and ammonium sulfites is passed to a cyclone separator 57, where most of the remainder of the solids (fly ash and ammonium sulfites) are separated out and conveyed via line 58 to collector 55. The flue gas stream 59 is withdrawn overhead from the cyclone separator 57, and flows into the lower zone of scrubber 14. As in the embodiment of FIG. 2, a substantial portion of the sulfur oxides have been removed from the flue gas stream before it reaches the scrubber 14. The scrubber 14 in FIG. 3 is essentially the same in its operation as its counterpart in FIGS. 1 and 2. As in the previous figures, the scrubber will not only remove the sulfur oxides, but also any particles of fly ash which have escaped previous removal steps. Some nitrogen oxides in the flue gas will also be removed by the scrubbing medium in the form of ammonium salts. In this case, however, a portion of the scrubber effluent solution of slurry 22, which contains ammonium sulfite and bisulfite, is pumped around and reintroduced at the top of the $SO_x$ scrubbing section 16 via pump around line 60. (A similar pump around line may also be used in the embodiment of FIGS. 1 and 2; pump arounds of this type are known in the art.)

The mixture of fly ash and ammonium salts which is collected in collector 55 is fed into rotary kiln 23. The ammonium salts are decomposed into ammonia, sulfur dioxide, and water vapor, with sulfur trioxide also being formed when the ammonium salt mixture contains ammonium sulfate. This reactor product gas is withdrawn from the kiln via line 25. A residue which is principally fly ash is discharged via line 61 from kiln 23. This residue may also contain ammonium sulfate, calcium sulfate, sodium sulfate, and/or magnesium sulfate, etc. depending on the temperature at which the kiln 23 is operated and on the chemical composition of the fly ash.

The gases containing $SO_2$, ammonia, and water vapor, which again could be derived from other sources, in line 25 are passed to a high temperature reactor 62, which in this embodiment includes a plurality of reaction sections. The gas stream 25 is split into two portions 63 and 64. The first portion 63 is preheated to the desired reaction temperature such as by the addition of air, and combustion of some of the contained $NH_3$ in burner 65. This raises the temperature of this stream to approximately 1300°–1400° F., at which temperature it enters the reactor 62. Reactor 62 contains a plurality of reaction sections (three are shown here). Since the reaction between ammonia and sulfur dioxide to make nitrogen and sulfur and hydrogen sulfide is exothermic, the portion of the reaction gas 64 is split again into two portions and added as a quench gas to reactor 62 after the first and second sections thereof. In this way the inlet temperature to each section is approximately 1300°–1400° F. The reaction product gas discharged from reactor 62 via line 68, containing sulfur dioxide, hydrogen sulfide, and elemental sulfur, is cooled in heat exchanger 69 to approximately 400°–650° F., and is introduced at this temperature into the low temperature Claus reactor 70. One or more Claus reaction stages may be used. As in the previous embodiments, this Claus reactor may contain a catalyst such as activated bauxite. The Claus reactor effluent is passed to condenser 71, liquid elemental sulfur is withdrawn via line 72, and Claus unit tail gas is withdrawn via line 73.

In place of kiln drying and decomposing, alternate methods of achieving the same results can be employed. One of several fluid beds can be used for this purpose, with separate or combined drying steps. The simplest operation is a single high temperature fluid bed maintained at high temperature reaction conditions into which the ammonium sulfite-containing liquid, slurry or solid mixture is injected. Drying, decomposing, and $SO_2$ reduction will take place side by side, resulting in the release of a reaction product gas containing, besides nitrogen and water vapor, a mixture of sulfur, sulfur dioxide, and hydrogen sulfide. The fluidized solids may be a captive bed of reaction catalyst such as activated bauxite, or fly ash, or both. The fluid bed may be operated between 500° and 2000° F. but preferably between 900° and 1500° F. Fly ash may be withdrawn as needed. Further passage of the reaction product gas through subsequent fixed bed Claus reactors is within the scope of this invention.

Alternatively, the resultant slurry can be dried by injection into a fluidized bed maintained at about 150°–300° F., preferably 175°–255° F., followed by decomposition of the dried salt in a second fluid bed operating at about 225° to 800° F. The vapors from the second bed are taken to the previously described high temperature reaction zone.

Various combinations of drying, decomposition, and reaction steps can be visualized without departing from the essence of this embodiment of the present invention. Batch operation is, of course, possible with an initial drying step, followed by decomposition and even a high temperature oxidation-reduction step. A high temperature fluidized bed is also within the scope of this embodiment of the invention where salt decomposition and the oxidation-reduction reaction take place essentially simultaneously with the release of elemental sulfur, water, nitrogen and hydrogen sulfide together with unconverted sulfur dioxide. Clean-up of this gas stream by passage through lower temperature Claus reactor stages is similar to the techniques described in connection with FIGS. 1–3.

The foregoing specification describes the application of this invention to the removal of sulfur oxides from gases containing them and the reduction of such oxides using ammonia as a reducing agent. Moreover, when ammonia is used as an absorbent some nitrogen oxides may also combine with the ammonia to form salts, such as ammonium nitrate and ammonium nitrite, leading to some $NO_x$ removal from the gas. The resultant ammonium salts will decompose along with the salts of the sulfur acids and, after passage through the high temperature reaction zone, will substantially decompose into nitrogen and water. The subject process is therefore a method of desulfurization of gases to form elemental sulfur and a partial nitrogen oxide removal method.

The invention will now be described further with reference to the examples which follow:

EXAMPLE 1

This example describes four laboratory runs in which sulfur dioxide was thermally reduced with ammonia. In each run, a feed gas containing sulfur dioxide and gaseous ammonia, was passed through a heated reactor. The $NH_3/SO_2$ mole ratio in the feed gas and the temperature were varied in each run as indicated in Table I below. The effluent gas from each run was analyzed and the analysis from each run is also indicated in Table I below. In each of the runs, the residence time in the reactor was between about 1 and 1.5 seconds.

TABLE I

| | Results in Runs in Example 1 | | | |
|---|---|---|---|---|
| Run No. | 1 | 2 | 3 | 4 |
| Reactor Temp. ° C. | 943 | 920 | 1040 | 1120 |
| $NH_3/SO_2$ mol ratio | 5.6/3 | 5.8/3 | 5/3 | 4/3 |
| Effluent Composition, mol %. | | | | |
| $H_2O$ | 58.7 | 63.4 | 44.9 | 58.5 |
| $H_2S$ | 11.6 | 7.2 | 21.9 | 4.7 |
| $SO_2$ | 1.5 | 4.6 | Nil | 5.6 |
| $N_2$ | 24.7 | 20.1 | 28.9 | 24.7 |
| $S_2$ | 3.4 | 7.1 | 2.1 | 6.0 |
| $NH_3$ | 0.3 | Nil | 1.8 | 0.2 |

The appearance and percentage content of nitrogen, elemental sulfur and hydrogen sulfide in the effluent demonstrates that the oxidation-reduction reaction took place to a substantial extent.

EXAMPLE 2

This example describes two laboratory runs in which sulfur dioxide was reduced by ammonia over a catalyst. In each run, a feed gas containing sulfur dioxide, ammonia, water vapor, and argon (as an inert tracer) was passed through a heated bed of activated bauxite catalyst. The $NH_3/SO_2$ mole ratio in the feed gas was about 1.511; mole rates of each component will be given in Table II below. The effluent gas was cooled to remove condensable substances. The remaining gas was analyzed and analysis indicated a complete disappearance of both ammonia and sulfur dioxide, and the appearance of hydrogen sulfide, nitrogen, and in one run, hydrogen. When the apparatus was taken apart, after the second run, a large quantity of elemental sulfur was found deposited on the lower part of the catalyst bed. A white soluble solid, possibly ammonium sulfite, was also found deposited on the catalyst.

The appearance and percentage content of nitrogen, elemental sulfur and hydrogen sulfide in the effluent demonstrates that the oxidation-reduction reaction took place to a substantial extent.

Data and results are in Table II below.

TABLE II

| Experimental Results (782 g Engelhard Activated Bauxite Catalyst) | | |
|---|---|---|
| Run No. | A | B |
| Reactor Temp., ° F. | 1300–1530° | 1275–1375° |
| Feed Gas,cc/min,S.T.P. | | |
| A | 920 | 635 |
| $H_2O$ | 1244 | 1244 |
| $NH_3$ | 590 | 590 |
| $SO_2$ | 396 | 396 |
| Effluent Gas, mol % | | |
| A | 70.7 | 67–73 |
| $H_2$ | 1.0 | — |
| $N_2$ | 21.2 | 17–24 |
| $NH_3$ | 0.1 | 0.1–0.2 |
| $SO_2$ | 0.8 | 0–0.1 |
| $H_2S$ | 6.2 | 5.9–8.6 |
| Liquid Analysis, wt. % | | |
| Elemental S | | 1.6 |
| $NH_4+$ | | 1.7 |
| $SO_4=$ | | 2.3 |
| $SO_3=$ | | 8.3 |
| $S=$ | | Tr. |
| Solid Analysis | | |
| Elemental S,% of Feed | | 19% |

EXAMPLE 2

This example describes three experiments showing that it is feasible to decompose ammonium sulfite, or ammonium sulfite-bisulfite mixtures, by heat either in the presence or in the absence of fly ash.

Experiment 1

Thirty grams of ammonium sulfite was heated in a round bottom flask for a period of 1.5 hours. About 90% disappeared as the temperature was gradually raised to 340° F.

Experiment 2

Twenty grams of fly ash, 59 grams of 45% aqueous ammonium bisulfite solution, 36 grams of ammonium sulfite, 1.5 grams of ammonium sulfate, and 10 cc of water were mixed into a paste and heated over a period of 1.5 hours to a final temperature of 520° F. in a round bottom flask. The final residue weighed 23 grams, indicating a nearly complete disappearance of the sulfites.

Experiment 3

This experiment, using an identical charge as above, followed the procedure of Experiment 2, except that the pot temperature was maintained below 400° F. over a period of about 3 hours, and was not allowed to climb above this level. A loss of approximately 75% of the salt content of the charge was observed.

The process of this invention provides an efficient means for converting the sulfur dioxide content in an $SO_2$-rich gas stream to elemental sulfur. This process is particularly applicable in locations where hydrogen-rich gas streams are utilized in a flue gas desulfurization process. The advantages of hydrogen over carbonaceous gaseous reducing agents, e.g., carbon monoxide and low molecular weight hydrocarbons, include minimal formation of soot, COS and $CS_2$ with attendant high quality product sulfur and minimum quantities of sulfur (elemental or combined) in the tail gas stream. The use of a thermal reactor upstream of the catalytic conversion stages is desirable because a higher operating temperature and greater temperature rise can be tolerated in a thermal reactor than in a catalytic converter. This makes it possible to replace several catalytic converter stages and the coolers following each stage with a single thermal reactor, resulting in considerable heat economy. Reduction of $SO_2$ to a mixture of elemental sulfur, $H_2S$, and unreacted $SO_2$, rather than entirely to $H_2S$ in the thermal reactor is desirable because this results in a smaller load on the Claus catalytic conversion unit, thereby increasing the sulfur recovery or reducing the number of catalytic converter stages required for the reaction of $H_2S$ and $SO_2$ to sulfur.

Having thus described and illustrated the present invention, what is claimed is:

1. A method for thermally reducing sulfur dioxide comprising the step of reacting sulfur dioxide with gaseous ammonia at a molar ammonia/sulfur dioxide ratio of at least 4:3 at a temperature above about 1200° F. such that one or more compounds selected from the group consisting of elemental sulfur and hydrogen sulfide are produced.

2. The method of claim 1 wherein the reduction is accomplished autogenously at a temperature within the range from about 1500° F. to about 3000° F.

3. The method of claim 1 wherein the reduction is accomplished within a residence time of about 1 to 1.5 seconds.

4. A process which comprises:
   a. thermally decomposing one or more ammonium salts selected from the group consisting of ammonium sulfite, ammonium bisulfite, ammonium sulfate and ammonium bisulfate, into a gaseous mixture comprising ammonia, sulfur oxides, and water vapor at a temperature within the range from 225° F. to 800° F.; and
   b. reacting said ammonia with sulfur oxides at a temperature within the range from about 500° F. to about 3000° F. in an oxidation-reduction reaction in a high temperature reaction zone with the formation of a reaction product mixture comprising elemental nitrogen and at least one member of the group consisting of elemental sulfur and hydrogen sulfide.

5. A process according to claim 4, in which the $NH_3/SO_x$ mole ratio in the ammonium salt or salts is at least about 4/3.

6. A process according to claim 4 in which the temperature in said high temperature reaction zone is in the range of about 500° F. to about 2000° F.

7. A process according to claim 5 in which the temperature in said high temperature reaction zone is in the range of about 900° F. to about 1500° F.

8. A process according to claim 7 in which said high temperature reaction zone contains a catalyst that would be effective in the reduction of $SO_2$ with hydrogen.

9. A process according to claim 8 wherein the catalyst is a transition metal or transition metal oxide.

10. A process according to claim 8 wherein the catalyst is activated bauxite.

11. A process for removing sulfur oxides from a gas stream containing the same with the formation of elemental sulfur, hydrogen sulfide, or both, which comprises:
    a. treating the gas stream with ammonia whereby said ammonia reacts with sulfur oxides in said gas stream with the formation of ammonium salts of sulfur acids, said ammonium salts comprising at least one salt of the group consisting of ammonium sulfite, ammonium bisulfite, ammonium sulfate, and ammonium bisulfate;
    b. separating said ammonium salts from said gas stream; and
    c. decomposing said ammonium salts via a high temperature reaction between $NH_3$ and $SO_2$ into a reaction product mixture comprising elemental nitrogen and at least one member of the group consisting of elemental sulfur and hydrogen sulfide.

12. A process according to claim 11 in which said ammonium salts are decomposed, at a temperature within the range from 225° F. to 800° F., into a gas mixture comprising ammonia and sulfur oxides and in which said ammonia and sulfur oxides are introduced into a high temperature reaction zone and converted therein into said reaction product mixture at a temperature within the range from about 500° F. to about 3000° F.

13. A process according to claim 12 in which the $NH_3/SO_x$ mole ratio in said ammonium salts is at least 4/3.

14. A process according to claim 12 in which said high temperature reaction is carried out at a temperature in the range of about 500° F. to about 2000° F.

15. A process according to claim 12 in which said high temperature reaction is carried out at a temperature in the range of about 900° F. to about 1500° F.

16. A process according to claim 15 in which said high temperature reaction is carried out in the presence of a catalyst that would be effective in the reduction of $SO_2$ with hydrogen.

17. A process according to claim 16 in which said catalyst is activated bauxite.

18. A process according to claim 11 in which the reaction products comprise hydrogen sulfide and unconverted sulfur dioxide in a molar ratio of about 2:1.

19. A process according to claim 18 in which said hydrogen sulfide is catalytically reacted with said unconverted sulfur dioxide to produce elemental sulfur.

20. A process according to claim 16 in which the catalyst is a transition metal or transition metal oxide.

21. A process which comprises introducing gaseous ammonia and gaseous sulfur dioxide into a high temperature reaction zone, at an ammonia to sulfur dioxide molar ratio of at least 4:3, thereby causing a thermal reaction between ammonia and sulfur dioxide to take place at a temperature above about 1200° F. with the formation of a reaction product mixture comprising elemental nitrogen and at least one member of the group consisting of elemental sulfur and hydrogen sulfide.

22. The method of claim 21 wherein the reaction is accomplished autogeneously at a temperature within the range from about 1500° F. to about 3000° F.

* * * * *